United States Patent [19]

Furuse et al.

[11] 4,241,750
[45] Dec. 30, 1980

[54] PRESSURE SETTING DEVICE

[75] Inventors: Akio Furuse; Yoshihiro Honma, both of Hachioji, Japan

[73] Assignee: Kabushiki Kaisha Cosmo Keiki, Tokyo, Japan

[21] Appl. No.: 963,876

[22] Filed: Nov. 27, 1978

[51] Int. Cl.³ .................................................. G05D 16/20
[52] U.S. Cl. .................................. 137/101.19; 137/102
[58] Field of Search ............... 137/102, 101.19, 101.21; 251/129

[56] References Cited

U.S. PATENT DOCUMENTS

| | | | |
|---|---|---|---|
| 3,858,598 | 1/1975 | Carman | 137/102 |
| 3,874,407 | 4/1975 | Griswold | 251/129 |

*Primary Examiner*—Gerald Goldberg
*Assistant Examiner*—Denis E. Corr
*Attorney, Agent, or Firm*—Pollock, Vande Sande & Priddy

[57] ABSTRACT

In a device in which a positive or negative pneumatic pressure source is coupled with a controlled system through a first electromagnetic valve and the controlled system is coupled with a negative or positive pneumatic pressure source through a second electromagnetic valve or opened therethrough to the air, and which is adapted so that the first and second electromagnetic valves are controlled to open or close to thereby set an air pressure in the controlled system, a deviation between the pressure of the controlled system and the set pressure is detected and the detected deviation signal is converted by a pulse converter into a pulse of the duty ratio or frequency corresponding to the deviation, by which pulse the first and second electromagnetic valves are controlled to open or close.

9 Claims, 5 Drawing Figures

Pulse converter 46

PRESSURE SETTING DEVICE

BACKGROUND OF THE INVENTION

This invention relates to a pressure setting device which is designed so that a positive or negative desired set pressure is applied to a controlled system by the employment of electromagnetic valves.

For example, in a variety of measurements, there are some occasions when measurement is made to observe how various physical quantities of a controlled system, such as temperature, stress, etc., vary with a positive or negative set pressure applied to the controlled system. In some cases, reference pressures of various values are applied to a variety of pressure instruments for the calibration thereof. For generating a desired set pressure for such a purpose, there has been proposed a pressure setting device of the type in which a positive or negative air pressure source and a controlled system are interconnected through a first electromagnetic valve, the controlled system is opened to the air through a second electromagnetic valve, the pressure of the controlled system is detected as an electric signal by a pressure sensor, and the first and second electromagnetic valves are selectively controlled in accordance with a deviation between the detected output and the set value.

In this kind of pressure setting device heretofore employed, a dead zone is set up about the set value and when the pressure of the controlled system is smaller in absolute value than the dead zone, the first electromagnetic value is opened and the second electromagnetic valve is held closed. Conversely, when the pressure of the controlled system is larger in absolute value than the dead zone, the first electromagnetic valve is closed and the second electromagnetic valve is held open, and when the pressure of the controlled system is in the dead zone, both electromagnetic valves are maintained in their closed state.

In the abovesaid conventional device, if electromagnetic valves of large flow rate are used, when the pressure of the controlled system enters into the dead zone, it is difficult to rapidly close both electromagnetic valves, and consequently the pressure of the controlled system readily passes through the dead zone and an operation is needed to return the pressure to the dead zone; namely so-called hunting results. This hunting can be avoided by the use of electromagnetic valves of small flow rate or by setting up a large dead zone. However, in the former case, it takes much time for the pressure of the controlled system to reach the set value, and the system accordingly exhibits poor response; and in the latter case, the accuracy of the set pressure is low.

To solve such problems, there has been proposed a pressure setting device in which there are provided in parallel a first electromagnetic valve of large flow rate for applying air pressure to the controlled system and a second electromagnetic valve of small flow rate for reducing the air pressure. With this conventional pressure setting device, when the pressure of the controlled system greatly differs from the set pressure, the electromagnetic valve of large flow rate is controlled, and when the difference between the two pressures becomes small, the electromagentic valve of small flow rate is controlled. In this case, however, four electromagnetic valves are required and their control is complicated, which results in the device becoming bulky and expensive.

If control valves whose opening can be controlled are used in place of the electromagnetic valves, response is relatively good, and the dead zone can be made small. But the control valves are expensive.

An object of this invention is to provide a pressure setting device which employs electromagnetic valves, achieves excellent response and can be produced at low cost.

Another object of this invention is to provide a pressure setting device which enables proportional control by the use of electromagnetic valves.

Still another object of this invention is to provide a pressure setting device which operates stably in the vicinity of a set pressure and causes the pressure of a controlled system to reach a set value relatively rapidly.

SUMMARY OF THE INVENTION

According to this invention, in a pressure setting device in which a positive or negative air pressure is applied from a pneumatic pressure source to a controlled system through a first electromagnetic valve, the pressure of the controlled system is detected as an electric signal by means of a pressure sensor and a deviation of the detected output from a set value is obtained by a deviation detecting comparator. The deviation signal from the comparator is converted by a converter to a pulse signal of relatively high speed. In this case, at least one of the parameters, i.e., pulse width, pulse interval, and the pulse frequency of the pulse signal, is varied in accordance with the deviation signal. By use of the pulse signal from the converter, an electromagnetic valve drive circuit is controlled to drive the first electromagnetic valve. For example, the duty ratio of the pulse signal is changed in accordance with the deviation signal and when the deviation signal is large, the period of opening the electromagnetic valve by the pulse signal (the high- or low-level period of the pulse signal) becomes long to cause an increase in the mean flow rate of the electromagnetic valve. When the deviation signal becomes small, the period of opening by the pulse signal becomes short to cause a decrease in the mean flow rate of the electromagnetic valve. When the set value is reached, the period of opening the electromagnetic valve enters into the dead zone region of the electromagnetic valve. In this manner, proportional control of the flow rate of the electromagnetic valve can be equivalently performed in dependence on the deviation signal.

In the case of changing the duty ratio of the pulse signal in accordance with the deviation signal, if the pulse frequency is also controlled to increase with a decrease in the deviation signal, highly accurate and rapid control can be achieved in the vicinity where the deviation signal is small.

Further, one end of a second electromagnetic valve for reducing the pressure of the controlled system in terms of its absolute value is coupled with the controlled system, and the other end of the second electromagnetic valve is opened to the air. The first electromagnetic valve is coupled with the positive or negative pneumatic pressure source, but the second electromagnetic valve is coupled with a negative or positive pneumatic pressure source. The polarity of the aforesaid deviation signal is detected by a selecting comparator, and a selecting circuit is controlled by the detected output so that one of the drive circuits for the first and second electromagnetic valves is controlled by the pulse output from the aforementioned pulse converter. In this instance, the period of opening the electromagnetic valve by the output pulse from the pulse converter in the state in which the pressure of the controlled system is in agreement with the set value, is selected a little longer than the minimum pulse width for opening the electromagnetic valve. In addition, a highly accurate pressure can be obtained by minimizing the hysteresis of the selecting comparator to cause the pressure of the controlled system to slightly fluctuate about the set value.

Moreover, if the period of opening the electromagnetic valve by the output pulse from the pulse converter, in the case of the pressure of the controlled system agreeing with the set value, is selected equal to or a little smaller than the minimum pulse width for opening the electromagnetic valve, a dead zone appears in some cases. If the period of opening the electromagnetic valve is selected to be very short; the dead zone becomes large. Further, if the period of opening the electromagnetic valve, in the case of the pressure controlled system being very close to the set value, is selected a little smaller than the minimum pulse width for opening the electromagnetic valve, it is also possible to return the electromagnetic valve to its closed state before it is completely opened.

DESCRIPTION OF THE PREFERRED EMBODIMENTS

Figure 1:
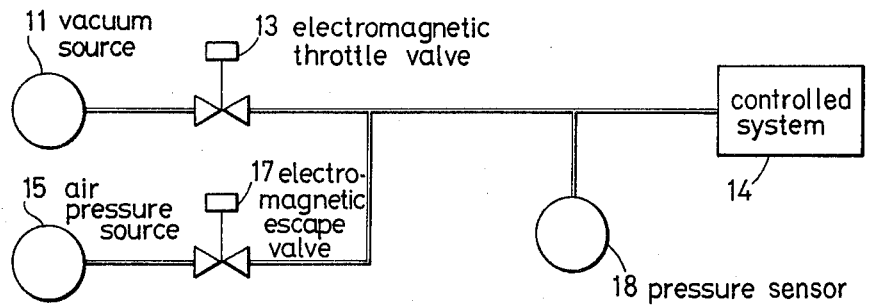
FIGS. 1 and 2 are schematic diagrams showing conventional pressure setting devices.

Referring first to FIG. 1, a conventional pressure setting device will be described. A negative air pressure source, that is, a vacuum source 11 is coupled with a controlled system 14 through an electromagnetic valve 13, and a positive air pressure source, that is, an air pressure source 15 is also coupled with the controlled system 14 through an electromagnetic valve 17. When it is desired to apply a set pressure to the controlled system 14, the pressure of the controlled system 14 is detected as an electric signal by a pressure sensor 18, the detected electric signal is compared with the set pressure, and based on the comparison result, the electromagnetic valve 13 is controlled to be turned ON or OFF, that is, opened or closed. In this case, a dead zone is set up about the set pressure, and when the pressure of the controlled system 14, i.e. a control pressure, exceeds the dead zone in terms of its absolute value, in other words when the set value is a negative pressure, the electromagnetic valve 17 serving as an escape valve is turned ON (opened), whereas the electromagnetic valve 13 serving as a throttle valve is turned OFF (closed). When the pressure of the controlled system enters into the range of the dead zone, both electromagnetic valves 13 and 17 are turned OFF, and when the pressure falls outside of the dead zone in terms of its absolute value, the escape valve 17 is turned OFF, whereas the throttle valve 13 is turned ON. In the event that the control pressure exceeds the set pressure, the escape valve 17 is turned ON and the throttle valve 13 OFF for a period of time proportional to a pressure deviation relative to the set value.

With such conventional control, when the control pressure gets out of the dead zone, the electromagnetic valves are turned ON or OFF to supply air to the controlled system 14 or to release therefrom air to control its pressure. But if the air flow rate in the ON state of the electromagnetic valves 13 and 17 is selected large, the control pressure readily exceeds the dead zone and hence must be controlled to return to the dead zone; namely so-called hunting occurs which makes it difficult to retain the control pressure within the dead zone. If the dead zone is made large so as to avoid such a defect, accuracy of the control pressure drops. If the flow rates of the electromagnetic valves 13 and 17 are made small, when the set pressure is greatly changed, it takes time for the control pressure to reach the set value; namely poor response results.

Figure 2:
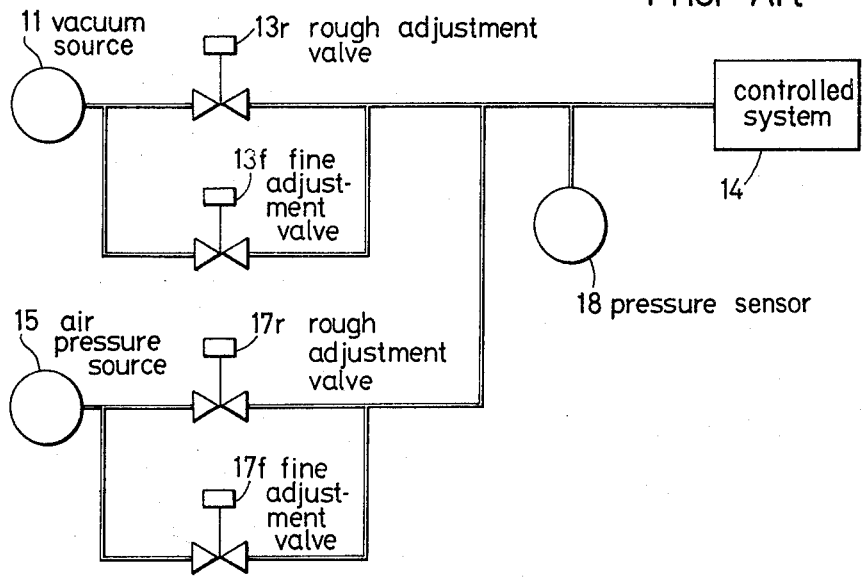

To overcome a drawback, there has been proposed such an arrangement of the type shown in FIG. 2 in which an electromagnetic valve 13r for rough adjustment and an electromagentic valve 13f for fine adjustment are provided in parallel on the side of the vacuum source 11 and similar electromagnetic valves 17r and 17f for rough and fine adjustment are also provided on the side of the air pressure source 15. In this case, the rough-adjustment electromagnetic valves 13r and 17r of large flow rate are controlled first to achieve a rough adjustment of the control pressure so that it rapidly approaches the set value, and then the fine-adjustment electromagnetic valves 13f and 17f of small flow rate are controlled to effect a fine adjustment, whereby the control pressure is caused to relatively quickly enter the dead zone, that is, reach the set value.

With such an arrangement, it is possible to rapidly follow the set pressure and make the dead zone small, but since two systems for fine adjustment and rough adjustment are needed, the entire structure and the control thereof are complicated, which results in the arrangement becoming costly.

Figure 3:
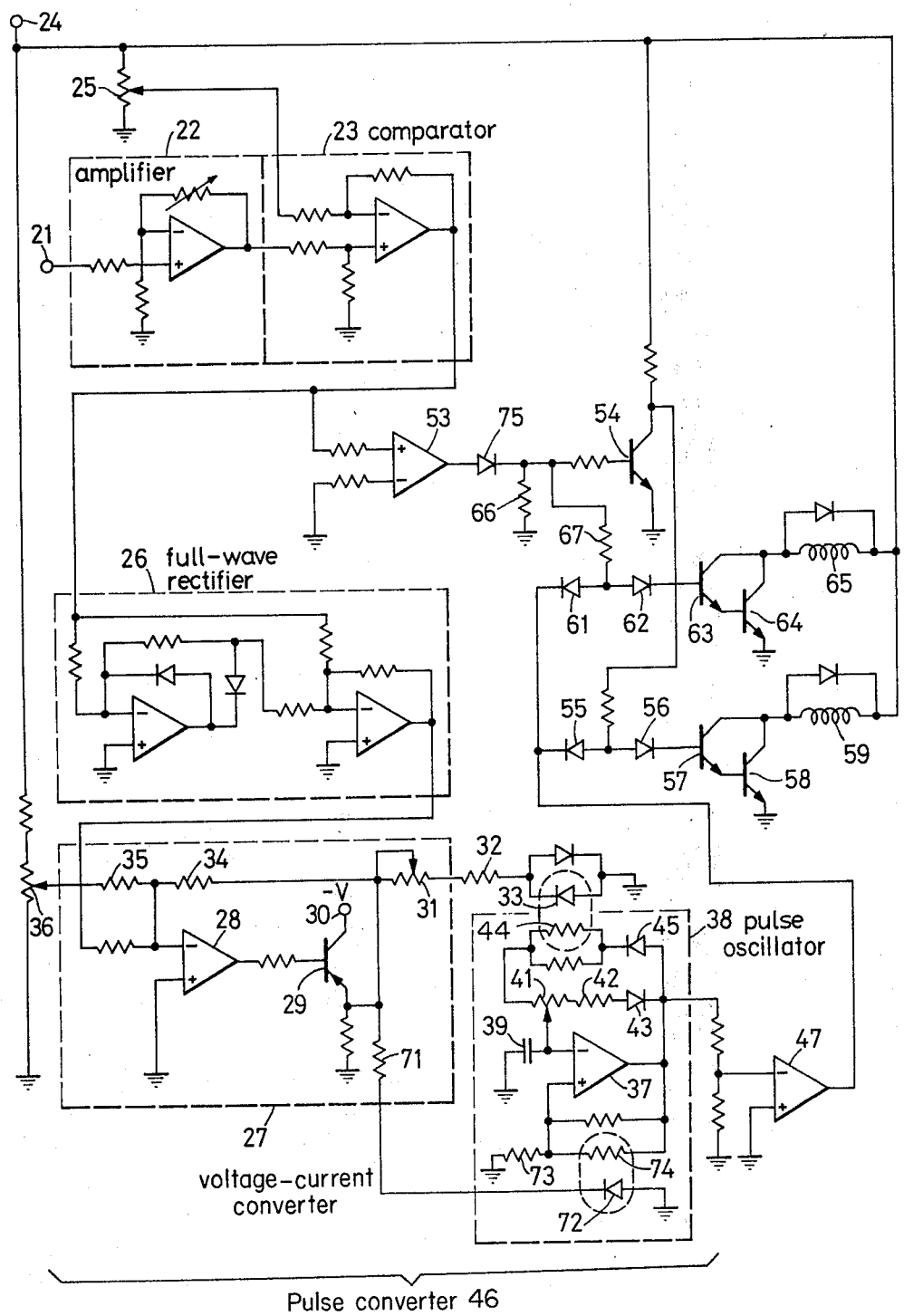
FIG. 3 is a schematic diagram illustrating an example of a control portion which is the principal part of the pressure setting device of this invention.

FIG. 3 illustrates a control portion of the pressure setting device of this invention, in which the pneumatic pressure source, the electromagnetic valves and the controlled system bear the same relationships as those in FIG. 1. The pressure of the controlled system 14, i.e. the control pressure, is detected as an electric signal by the pressure sensor 18. The pressure signal thus obtained is supplied from a terminal 21 to one of input terminals of a comparator 23 via an amplifier 22. A set value signal, which is indicative of a pressure set by a setter composed a variable resistor 25 inserted between a power source terminal 24 and ground, is applied via a movable element of the variable resistor 25 to the other input terminal of the comparator 23, in which the set value signal is compared with the abovesaid detected pressure signal. As a consequence, a signal representing a deviation of the detected pressure signal from the set value signal is derived from the comparator 23 and is then rendered by a fullwave rectifier 26 into a signal indicating the absolute value of the deviation. The absolute value signal of the deviation signal is provided to a pulse converter 46 for conversion to a pulse having an ON-OFF ratio corresponding to the magnitude of the deviation signal.

The pulse converter 46 is constructed, for example, as follows. The output from the full-wave rectifier 26 is provided via an operational amplifier 28 to the base of a pnp type transistor 29 for conversion into a current. The transistor 29 has its collector connected to a negative power source terminal 30 and its emitter grounded via a resistor and, at the same time, via a variable resistor 31, a resistor 32 and a photo diode 33. Further, the emitter of the transistor 29 is connected via a resistor 34 to the input side of the amplifier 28 for feedback thereto, and the feedback point is connected via a resistor 35 to a movable element of a variable resistor 36 for bias adjustment. Moreover, the emitter of the transistor 29 is grounded via a resistor 71 and a photo diode 72. The variable resistor 36 is connected between the power source terminal 24 and ground. The voltage of the movable element of the variable resistor 36 is selected corresponding to the offset voltage of each of the photo diodes 33 and 72. A bias voltage available at the movable element of the variable resistor 36 and the output from the full-wave rectifier 26 are added together in operational amplifier 28, and the added output is supplied to the transistor 29, with the result that a current proportional to the output from the full-wave rectifier 26 is applied to each of the photo diodes 33 and 72 without being affected by its offset voltage.

A pulse oscillator 38 is provided which includes an operational amplifier 37. An inverted input terminal of the operational amplifier 37 is grounded via a capacitor 39 and, at the same time, is connected to a movable element of a variable resistor 41, which is, in turn, connected at one end to the output side of the operational amplifier 37 via a resistor 42 and a diode 43. The other end of the variable resistor 41 is also connected to the output side of the operational amplifier 37 via a photoconductive cell 44 for receiving light from the photo diode 33, such as a CdS cell, and a diode 45. A non-inverted input terminal of the operational amplifier 37 is grounded via a resistor 73 and, at the same time, connected to a photoconductive cell 74 which is connected to the output end of the operational amplifier 37. The photoconductive cell 74 receives light from the photo diode 72.

Where the deviation signal is large, the current flowing in the transistor 29 increases, so that currents flowing in the photo diodes 33 and 72 increase to intensify their radiation, reducing the resistance values of the photoconductive cells 44 and 74. As a result of this, the time constant for charging the capacitor 39 is decreased to shorten the positive period of the output pulse from the operational amplifier 37. The negative period of this output pulse is dependent upon the discharge time constant that charges in the capacitor 39 flow through the resistor 42 and the diode 43, and this negative period is constant. A decrease in the resistance value of the photoconductive cell 74 serves to lower the oscillation frequency of the pulse oscillator 38 and lengthen the negative period of the output pulse. In the case of the deviation signal becoming small, the current flowing in the transistor 29 decreases to lower the light of the photo diode 33, and the charge time constant of the capacitor 39 increases to lengthen the positive period of the output pulse. As a consequence, the light of the photo diode 72 lowers to increase the resistance value of the photoconductive cell 74, with the result that the oscillation frequency is raised and the negative period of the output pulse is reduced.

The output derived at the output side of the operational amplifier 37 is provided to the input side of a buffer circuit 47. The input pulse is inverted in polarity by the buffer circuit 47, and the output pulse therefrom is used for controlling an electromagnetic valve. In this instance, the electromagnetic valve to be controlled is selected in dependence on the polarity of the deviation signal. That is, the deviation signal from the comparator 23 is also supplied to a non-inverted input terminal of an electromagnetic valve selecting comparator 53 and compared with the ground potential to detect the polarity of the deviation signal. The hysteresis of the comparator 53 is selected as small as possible. When the deviation signal is positive, the comparator 53 produces a positive high-level output, which is applied via a diode 75 to a transistor 54 to render it conductive. The transistor 54 has its collector connected to the power source terminal 24 and its emitter grounded.

The output side of the buffer circuit 47 is connected to the base of a driving transistor 57 via diodes 55 and 56 which are interconnected in opposite polarities. The emitter current of the transistor 57 is amplified by a transistor 58, and the amplified current is supplied to a coil 59 of an electromagnetic valve (e.g., valve 13 in FIG. 1). Further, the output side of the buffer circuit 47 is also connected to a driving transistor 63 via diodes 61 and 62 interconnected in opposite polarities. The emitter current of the transistor 63 is amplified by a transistor 64 and then applied to a coil 65 of the other electromagnetic valve (e.g., valve 17 in FIG. 1). The cathodes of the diodes 55 and 61 are on the side of the buffer circuit 47.

The collector of the transistor 54 is connected to the connection point of the diodes 55 and 56. The cathode side of the diode 75 is grounded via a resistor 66 and, at the same time, connected via a resistor 67 to the connection point of the diodes 61 and 62. Where the deviation signal is positive, the transistor 54 conducts, as described above, and its collector potential becomes the ground potential to maintain the connection point of the diodes 55 and 56 substantially at the ground potential, inhibiting a supply of the output pulse from the buffer circuit 47 to the transistor 57. In this state, in the positive period of the output pulse from the buffer circuit 47, the current from the diode 75 also flows through the diode 62 to conduct the transistor 63, whereas in the negative period of the output pulse from the buffer circuit 47 the current from the diode 75 flows through the diode 61 but does not flow through diode 62, so that the transistor 63 becomes non-conductive. In this manner, only the transistor 63 is controlled by the output pulse from the buffer circuit 47.

Conversely, when the deviation signal is negative, the comparator 53 provides an output of a negative constant level to hold the connection point of the diodes 61 and 62 substantially at ground potential via the resistors 66 and 67 and turn OFF the transistor 54, preventing the application of the output pulse from the buffer circuit 47 to the transistor 63. In the positive period of the output pulse from the buffer circuit 47, the diode 55 does not conduct and a current flows from the power source terminal 24 to conduct the transistor 57. In the negative period of the output pulse from the buffer circuit 47, a current also flows in the diode 55, while on the other hand the diode 56 becomes non-conductive to turn OFF the transistor 57. Thus, only the transistor 57 is controlled by the output from the buffer circuit 47.

When it is desired, for instance, to apply a negative set pressure to the controlled system 14 in FIG. 1, the coil 59 in FIG. 3 is used as an exciting coil of the electromagnetic valve 13 and the coil 65 in FIG. 3 is used as an exciting coil of the electromagnetic valve 17. When the pressure signal detected by the pressure sensor 18 is smaller in absolute value than the set pressure at the beginning of the setting, the deviation detecting comparator 23 produces a negative deviation signal and the comparator 53 for the electromagnetic valve selection yields a negative output to hold the transistor 63 in its non-conductive state, thus controlling only the transistor 57 by the output pulse from the buffer circuit 47. Generally, when the set pressure is changed, the deviation signal is large and, as described previously, the positive period of the output pulse from the pulse converter, that is, the negative period of the output pulse from the buffer circuit 47 becomes short. Accordingly, the ON (positive) period of the output pulse becomes markedly long relative to its OFF (negative) period, and in the ON period, the transistors 57 and 58 conduct, and the period in which the electromagnetic valve 13 opens is very much longer than the period in which it is closed. Consequently, the pressure of the controlled system 14 rapidly approaches the negative set pressure, and as the former approaches the latter, the magnitude of the deviation signal gradually decreases and the OFF period of the output pulse from the buffer circuit 47 becomes long, whereas the ON period becomes short relative to the OFF period, with the result that the period of the electromagnetic valve 13 opening is shortened. When the detected pressure signal becomes equal to the set pressure signal, the ON period of the output pulse becomes short and the electromagnetic valve 13 is hardly opened, thus maintaining the controlled system at the set pressure.

When the detected pressure signal becomes larger in absolute value than the set pressure signal, the deviation signal becomes positive and the comparator 53 produces a positive output to conduct the transistor 54, holding the driving transistor 57 non-conductive. Accordingly the output pulse from the buffer circuit 47 controls only the driving transistor 63 to apply a pulse current to the exciting coil 65 of the electromagnetic valve 17. In other words, when the pressure of the controlled system becomes negative relative to the set pressure, the electromagnetic valve 17 is controlled to open or close, returning the pressure of the controlled system to the set pressure. A positive set pressure can be applied to the controlled system 14 by controlling the electromagnetic valves 13 and 17 with the driving coils 59 and 65, respectively.

As has been described in the foregoing, according to the pressure setting device of this invention, the ON-OFF ratio of a pulse is altered in accordance with the magnitude of a difference between a set pressure and a pressure of a controlled system, and by controlling an electromagnetic valve with the pulse, the flow rate of the valve can be equivalently controlled in succession and the pressure of a controlled system can be rapidly set accurately at a set value. Accordingly, in the case where the pressure of the controlled system is changed in a stairstep manner and measured at each stage, accurate pressure measurement can be achieved in a short time. Since no control valve is used, the pressure setting device of this invention can be produced at low cost.

Especially in the case where the oscillation frequency of the oscillator 38 in the pulse converter 46 is also controlled by the deviation signal, as shown in the foregoing embodiment of this invention, when the deviation signal becomes small, the ON period of the output pulse from the buffer circuit 47, that is, the period in which the electromagnetic valve is controlled to open is reduced and, at the same time, the OFF period of output pulse is shortened, so that the pressure to the controlled system 14 is frequently changed little by little and hence can be made equal to a set value smoothly and rapidly.

In FIG. 3, the buffer circuit 47 may be omitted, in which case the polarity of the output pulse from the pulse converter 46 and the relationship between the opening and closing of the electromagnetic valves are made opposite to those in the foregoing embodiment. Further, the photo diode 72 and the photoconductive cell 74 in the pulse oscillator 38 may also be left out. In this case, the positive period of the output pulse from the buffer circuit 47 is always constant, and the smaller the deviation signal becomes, the longer the OFF period of the output pulse becomes. To ensure the opening of the electromagnetic valve, it is necessary to make the positive period of the output pulse long to some extent, but in the state that the pressure of the controlled system 14 is extremely close to the set pressure, there are some occasions when a pressure change in the controlled system 14 by one opening of the electromagnetic valve becomes relatively large to make it relatively difficult to achieve the set pressure with accuracy, and further, the pulse interval becomes markedly long, and as the set pressure is approached, the pressure control speed is fairly reduced. But, as described previously, if the pulse frequency is also controlled, that is, if the positive period of the pulse is also controlled, the pressure of the controlled system can be controlled rapidly and accurately in the vicinity of the set pressure.

In the foregoing, as a pneumatic pressure source for reducing the pressure of the controlled system 14 in terms of its absolute value, the pressure source 15 is used in the case of setting the controlled system 14 to a negative pressure, and the vacuum source 11 is used in the case of setting the controlled system 14 to a positive pressure. But it is also possible to adopt such an arrangement in which the pneumatic pressure source for reducing the pressure is omitted and the end of the electromagnetic valve on the side of the omitted pneumatic pressure source is opened to the air. With the provision of the abovesaid pneumatic pressure source, however, the control speed rises.

In the embodiment described previously, the OFF period of a pulse is controlled in accordance with a deviation signal, but it is also possible to control only the ON period of the pulse or both of the ON and OFF periods of the pulse at the same time. Also, it is possible to make the pulse width constant and control the pulse frequency. This invention is also applicable to the case where there is a little air flow in the controlled system in the foregoing.

Figure 4:
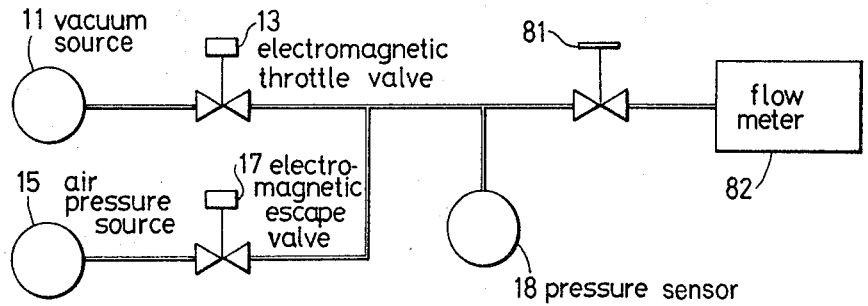
FIG. 4 is a diagram showing an experimental example of this invention.

Next, an experimental example of this invention will be described. In practice, since pressure is applied to a controlled system with no escape, the pressure of the controlled system immediately reaches a set value upon actuation of the pressure setting device. Accordingly, it is difficult to observe how the pressure setting device operates in the presence of a deviation between the pressure of the controlled system and the set pressure. Then, as shown in FIG. 4, a throttle valve 81 is used in place of the controlled system 14 in the arrangement of FIG. 1 and a flow meter 82 is connected to the end of the throttle valve 81 on the opposite side from the electromagnetic valves 13 and 17. The set pressure is selected so that when the pressure on the primary side of the throttle valve 81, that is, on the side of the electromagnetic valves 13 and 17, and consequently the pressure detected by the pressure sensor 18 reaches the set value, the flow rate on the secondary side of the throttle valve 81 is reduced to zero and that as a difference between the set pressure and the detected one by the pressure sensor 18 increases, the amount of escape from the throttle valve 81 increases.

Figure 5:
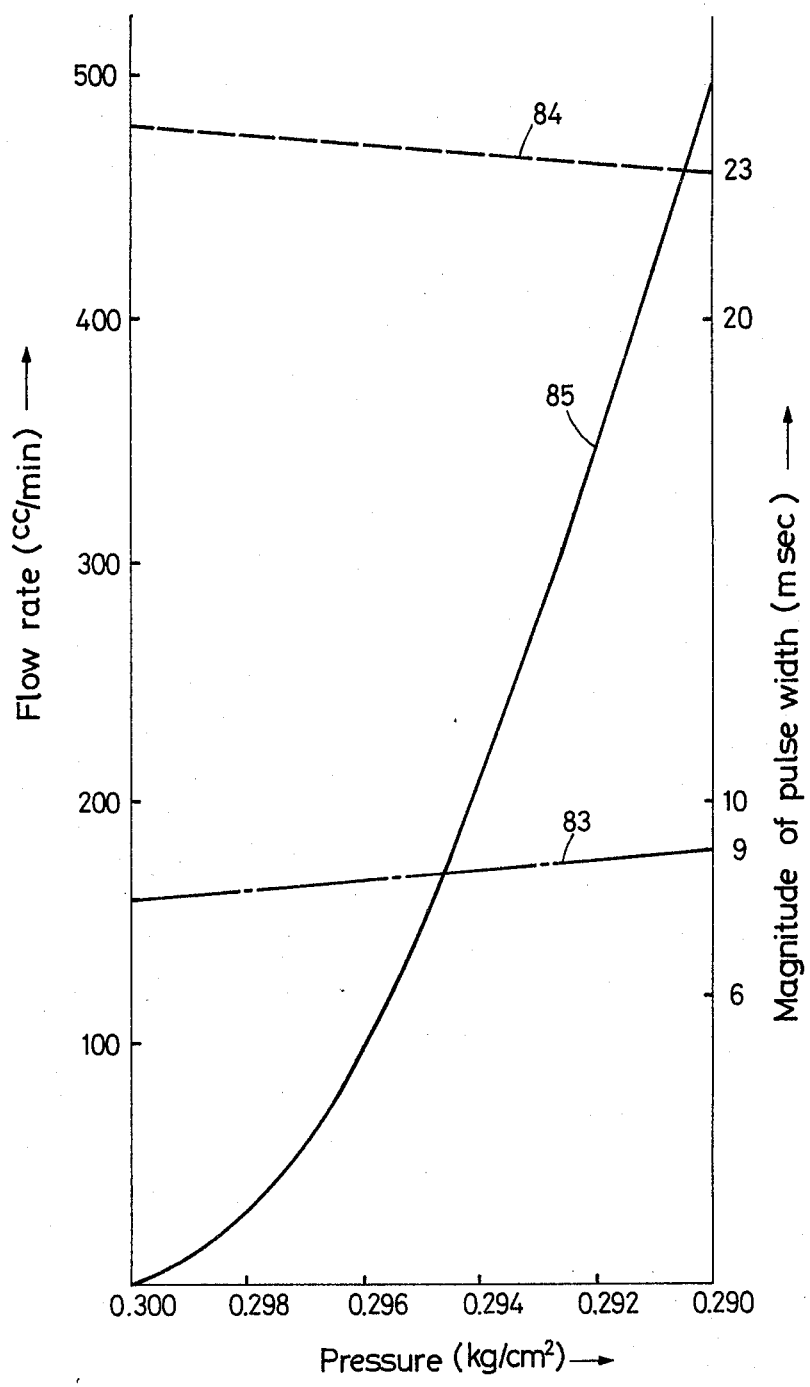
FIG. 5 is a graph showing the relationships of an output pulse and the flow rate to a detected pressure in the experimental example of FIG. 4.

In our experiment, the full scale of the pressure settable in the pressure setting device was 1 Kg/cm$^2$. The set pressure was selected to be 0.3 Kg/cm$^2$ and the electromagnetic valves 13 and 17 were such that the minimum pulse width for opening them was 6 milliseconds. The periods of opening and closing the electromagnetic valve 13 by a drive pulse and the flow rate on the secondary side of the throttle valve 81 were respectively measured against the detected pressure of the pressure sensor 18. The measured results are indicated by curves 83, 84 and 85 in FIG. 5. In FIG. 5, the abscissa represents the detected pressure of the pressure sensor 18. As the right-hand side in FIG. 5 is approached, the pressure becomes smaller than the set pressure, 0.3 Kg/cm$^2$, that is, the deviation increases. The ordinate on the right-hand side represents the magnitude of the pulse width, and the ordinate on the left-hand side represents the flow rate (cc/min.) on the secondary side of the throttle valve 81. In this example, the pulse width used is larger than the minimum pulse width, 6 milliseconds, necessary for complete opening of the electromagnetic valves 13 and 17 by 2 milliseconds under the set pressure. Accordingly, both electromagnetic valves 13 and 17 are actuated, with the pressure of the controlled system slightly fluctuating about the set value at all times. Needless to say, as the deviation increases, the period of opening the electromagnetic valve by the output pulse from the pulse converter becomes longer, as indicated by the curve 83, and conversely, the period of closing the electromagnetic valve becomes shorter, as indicated by the curve 84. Though not shown, when the deviation was 0.300 Kg/cm$^2$, the period of opening the electromagnetic valve was 10 milliseconds and the period of closing the valve was 22 milliseconds. Since the width of the output pulse from the pulse converter thus varies with the deviation, if the deviation is large, the set pressure is approached with a large flow rate, and if the deviation is small, the set pressure is approached with a small flow rate. Consequently, there is no fear of hunting and the set pressure can be approached rapidly. This state corresponds to the curve 85 in FIG. 5. In the portion of the deviation being large, that is, the right-hand portion in FIG. 5, the inclination of the curve is large, but in the left-hand portion which is close to the set pressure, the inclination is small and the set pressure is gradually approached. When a pressure of 0.3 Kg/cm$^2$ was set for the controlled system 14 with no escape without using the throttle valve 81 under the same condition as in the above, the period of opening the electromagnetic valve by the output pulse from the pulse converter was 8 milliseconds, and the period of closing the electromagnetic valve was 24 milliseconds. This indicates that the present experiment was correct.

It will be apparent that many modifications and variations may be effected without departing from the scope of the novel concepts of this invention.

What is claimed is:

1. A pressure setting device comprising:
a pneumatic pressurizing source; a pneumatic depressurizing source; a controlled system; a first electromagnetic valve inserted in a pipe interconnecting the pneumatic pressurizing source and said controlled system for applying and cutting off air pressure from the pneumatic pressurizing source to said controlled system; a second electromagnetic valve inserted in a pipe interconnecting the pneumatic depressurizing source and said controlled system for reducing the pressure applied to said controlled system; a pressure sensor for detecting, as an electric signal, the pressure of the controlled system; a deviation detecting comparator for producing a deviation signal representative of a deviation between the output from said pressure sensor and a set value; a full-wave rectifier for converting the value of the deviation signal into an absolute value; a pulse converter for converting the absolute value of the deviation signal into a pulse signal having at least one of the parameters pulse width, pulse interval, and frequency corresponding to the magnitude of the absolute value; first and second drive circuits adapted to be controlled by an output pulse from the pulse converter to drive the first and second electromagnetic valves, respectively; a selecting comparator for detecting the polarity of the deviation signal to produce a selection signal; and a selection circuit responsive to said selection signal for determining which one of the first and second drive circuits is to be supplied with the output pulse from said pulse converter.

2. A pressure setting device according to claim 1, wherein the pulse converter comprises an oscillator, and pulse width control means responsive to said deviation signal for controlling a pulse width determining time constant element in said oscillator.

3. A pressure setting device according to claim 2, wherein the pulse width control means comprises a time constant circuit which includes a capacitor, a resistance element having a photoconductive cell as one part of the resistance element, and a light emitting device which radiates light onto the photoconductive cell and which is controlled by the output from the full-wave rectifier.

4. A pressure setting device according to claim 3, which further includes an adder for supplying the light emitting device with a bias for compensating for an offset voltage of the light emitting device, the bias being superimposed on the output from the full-wave rectifier.

5. A pressure setting device according to claim 3, wherein the light emitting device is a light emitting diode, and wherein there is further provided a voltage-current converter for converting the output voltage from the full-wave rectifier into a current for supply to the light emitting diode.

6. A pressure setting device according to claim 2, which further includes frequency changing means for controlling the oscillation frequency of the oscillator with the output from the full-wave rectifier.

7. A pressure setting device according to claim 6, wherein the frequency changing means comprises a photoconductive cell which is a portion of a resistance element that determines the oscillation frequency of the oscillator, and a light emitting device for irradiating light to the photoconductive cell, said light emitting device being controlled by the output from the full-wave rectifier.

8. A pressure setting device according to claim 1, wherein the period during which the first and second electromagnetic valves are opened by the output pulse from the pulse converter when the pressure of the controlled system reaches the set pressure is a little longer than the minimum pulse width necessary for opening the electromagnetic valves.

9. A pressure setting device according to claim 1, wherein the period during which the first and second electromagnetic valves are opened by the output pulse from the pulse converter when the pressure of the controlled system reaches the set pressure is equal to or a little smaller than the minimum pulse width necessary to open said electromagnetic valves.

* * * * *